(12) United States Patent
Kim

(10) Patent No.: US 7,691,537 B2
(45) Date of Patent: Apr. 6, 2010

(54) ELECTROLYTE FOR LITHIUM SECONDARY BATTERY AND A LITHIUM SECONDARY BATTERY INCLUDING THE SAME

(75) Inventor: Cheonsoo Kim, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 719 days.

(21) Appl. No.: 11/481,911

(22) Filed: Jul. 7, 2006

(65) Prior Publication Data

US 2007/0009806 A1     Jan. 11, 2007

(30) Foreign Application Priority Data

Jul. 7, 2005    (KR)  .................. 10-2005-0061409

(51) Int. Cl.
*H01M 6/16*     (2006.01)
(52) U.S. Cl. .................. 429/329; 429/332; 429/337; 429/186; 429/330; 429/333; 252/62.2
(58) Field of Classification Search .............. 429/329, 429/332, 337, 188, 330, 333; 252/62.2
See application file for complete search history.

(56) References Cited

U.S. PATENT DOCUMENTS

| | | | |
|---|---|---|---|
| 6,942,948 B2 * | 9/2005 | Takehara et al. | 429/329 |
| 6,958,198 B2 * | 10/2005 | Iwamoto et al. | 429/332 |
| 7,097,944 B2 * | 8/2006 | Murai et al. | 429/330 |
| 7,223,500 B2 | 5/2007 | Noh et al. | |
| 7,223,501 B2 | 5/2007 | Jung et al. | |
| 2006/0024585 A1 | 2/2006 | Tamura et al. | |
| 2006/0024586 A1 | 2/2006 | Tamura et al. | |

FOREIGN PATENT DOCUMENTS

| | | | |
|---|---|---|---|
| EP | 1 276 165 | * | 1/2003 |
| JP | 06-333596 | | 12/1994 |
| JP | 07-176323 | | 7/1995 |
| JP | 07-320779 | | 12/1995 |
| JP | 08-064238 | | 3/1996 |
| JP | 08-321312 | | 12/1996 |
| JP | 09-073918 | | 3/1997 |
| KR | 2003-68714 A | | 8/2003 |
| KR | 2004-83670 A | | 10/2004 |
| KR | 2005-45297 | | 5/2005 |
| WO | WO 2004/086549 | | 10/2004 |

OTHER PUBLICATIONS

Megahed, Sid et al. "Lithium-ion rechargeable batteries." Journal of Power Sources. vol. 51, Issue 1-2, Aug.-Sep. 1994; pp. 79-104.
Megahed, Sid and Bruno Scrostai, "Lithium-ion Rechargeable Batteries", *Journal of Power Sources*, 51 (1994), pp. 79-104.
Yang, C.R., Y.Y. Wang and C.C. Wan, "Composition Analysis of the Passive Film on the Carbon Electrode of a Lithium-ion Battery with an EC-Based Electrolyte", *Journal of Power Sources*, 72 (1998), pp. 66-70.

* cited by examiner

*Primary Examiner*—Laura S Weiner
(74) *Attorney, Agent, or Firm*—Stein McEwen, LLP

(57) ABSTRACT

An electrolyte for a lithium secondary battery and a lithium secondary battery having the electrolyte, the electrolyte including a lithium salt; a non-aqueous organic solvent including γ-butyrolactone; and succinic anhydride.

29 Claims, 1 Drawing Sheet

ELECTROLYTE FOR LITHIUM SECONDARY BATTERY AND A LITHIUM SECONDARY BATTERY INCLUDING THE SAME

CROSS-REFERENCE TO RELATED APPLICATION

This application claims the benefit of Korean Patent Application No. 2005-61409, filed on Jul. 7, 2005 in the Korean Intellectual Property Office, the disclosure of which is incorporated herein by reference.

BACKGROUND OF THE INVENTION

1. Field of the Invention

An aspect of the present invention relates to an electrolyte for a lithium secondary battery and a lithium secondary battery including the electrolyte, and more particularly, to an electrolyte for a lithium secondary battery capable of sustaining good battery performance and suppressing a swelling phenomenon affecting the thickness of the battery caused from a gas generated in the battery and a lithium secondary battery including the electrolyte.

2. Description of the Related Art

Recently, in the rapid development of electronic, communication, and computer industries, small-sized light-weight high-performance portable electric apparatuses such as camcorders, mobile phones, and notebook PCs have been widely used. Therefore, demand for batteries having a light weight, a long life cycle, and high reliability have increased. Particularly, in comparison with conventional lead acid batteries, nickel cadmium batteries, nickel hydride batteries, and nickel zinc batteries, a rechargeable lithium secondary battery has three times energy density per unit weight and a high charging speed. Thus, the rechargeable lithium secondary battery has been widely researched and developed.

A positive electrode activation material of the lithium secondary battery is made of a lithium metal oxide, and a negative electrode activation material of the lithium secondary battery is made of a lithium metal, a lithium alloy, a crystalline carbon, an amorphous carbon, or a carbon complex. The lithium secondary batteries may be classified into a lithium ion battery, a lithium ion polymer battery, and a lithium polymer battery according to types of separators and electrolytes. In addition, the lithium secondary batteries may be classified into a cylinder type, a polygon type, and a coin type.

Since an average discharging voltage of the lithium secondary battery ranges from about 3.6 V to about 3.7 V, the lithium secondary battery can generate a higher power than alkali batteries, Ni—MH batteries, and Ni—Cd batteries. However, in order to generate such a high driving voltage, an electrolyte composite which is electro-chemically stable in a charging discharging range from 0 to 4.2 V is needed. For the reason, a mixture of a non-aqueous carbonate-based solvent such as ethylene carbonate, dimethyl carbonate, and diethyl carbonate is used for the electrolyte. However, in comparison with an aqueous electrolyte used for the Ni—MH battery or the Ni—Cd battery, the non-aqueous electrolyte having such a composition has problems in that, since ion conductivity is too low, battery characteristics at a high charging discharging speed deteriorate At the initial charging period of the lithium secondary battery, lithium ions extracted from the lithium metal oxide of the positive electrode move to the carbon electrode, that is, the negative electrode to be intercalated to the carbon. Since the lithium ions are a highly reactive material, the lithium ions react with the carbon electrode to form $Li_2CO_3$, $Li_2O$, or LiOH, so that a film is formed on a surface of the negative electrode. The film is called a solid electrolyte (solid electrolyte interface; SEI) film. The SEI film formed at the initial charging period has a function of preventing the lithium ions from reacting with the negative carbon electrode or other material during the charging and discharging periods. In addition, the SEI film serves as an ion tunnel for passing only the lithium ions. In general, the lithium ions may be subject to solvation, and thus, the lithium ions together with an organic solvent having a large molecule weight are co-intercalated on the carbon electrode, so that a structure of the negative electrode may be destructed. The ion tunnel has a function of preventing destruction of the structure of the negative electrode. When the SEI film is formed, the lithium ions do not react with the negative carbon electrode or other material as an undesired reaction, so that an amount of the lithium ions can be reversibly maintained. Namely, the carbon of the negative electrode reacts with the electrolyte at the initial charging period to form a passivation layer such as the SEI film on the surface of the negative electrode. Therefore, the electrolyte is not dissolved, but the charging and discharging can be stably performed (see J. Power Sources, 51 (1994), 79-104). As a result, after the initial charging and discharging periods, in the lithium secondary battery, an irreversible forming reaction of the passivation layer does not occur, and a stable life cycle can be maintained.

However, during the forming reaction of the SEI film, there is a problem of gas generation in the inner portion of the battery caused from the dissolvation of the carbonate-based organic solvent (see J. Power Sources, 72 (1998), 66-70). Examples of the gasses generated in the inner portion of the battery, include $H_2$, CO, $CO_2$, $CH_4$, $C_2H_6$, $C_3H8$, and $C_3H_6$ according to types of the non-aqueous organic solvent and the negative electrode activation material. Due to the gas generation in the inner portion of the battery, the thickness of the battery expands at the charging period. In addition, as time elapses after the charging period, electrochemical energy and thermal energy increase. Therefore, the passivation layer may be gradually destructed to expose the negative electrode. The exposed negative electrode continuously reacts with ambient electrolyte as a side reaction. At this time, the gas is continuously generated, so that an internal pressure of the battery increases. Due to the increase in the internal pressure, the polygon type lithium polymer battery swells in a specific direction, or a specific surface of the battery is deformed. Therefore, a problem with the adhesiveness between the electrode plates in the electrode assembly of the battery occurs, so that there is deterioration in performance and stability of the battery as well as difficulty in set-mounting the lithium secondary battery to portable electric apparatuses.

In order to solve the aforementioned problems, there is proposed a method of mounting a current breaker or a vent for emitting the electrolyte at the state that the internal pressure increases up to a predetermined level, thereby improving the stability of the secondary battery including the non-aqueous electrolyte. However, the method has a problem in that malfunctions or dangers may occur due to increase in the internal pressure. In addition, in order to suppress the increase in the internal pressure, there is proposed a method of injecting an additive into the electrolyte to change the SEI forming reaction. For example, in Japanese Patent Application Publication No. 9-73918, there is disclosed a method of adding a diphenyl picrylhydrazyl compound of less than 1%, thereby improving a high-temperature storage property of the battery. In addition, in Japanese Patent Application Publication No. 8-321312, there is disclosed a method of adding N-buthyl amine-based compound of from 1% to 20%, thereby improving life cycle and a long-time storage property of the battery. In addition, in Japanese Patent Application Publication No. 8-64238, there is disclosed a method of adding a calcium salt ranging from $3\times10^{-4}$ mol to $3\times10^{-2}$ mol, thereby improving a storage property of the battery. In addition, in Japanese Patent Application Publication No. 6-333596, there is disclosed a method of adding an azo-based compound for suppressing reaction between the electrolyte and the negative electrode, thereby improving a storage property of the battery. In addition, in Japanese Patent Application Publication No. 7-176323, there is disclosed a method of adding $CO_2$ to the electrolyte. In addition, in Japanese Patent Application Publication No. 7-320779, there is disclosed a method of adding a sulfide-based compound to the electrolyte, thereby suppressing dissolvation of the electrolyte.

Conventionally, as described above, in order to improve the storage property and stability of the battery, a small amount of an organic or inorganic material is added to form and introduce a suitable film such as the SEI film on the surface of the negative electrode. However, the additive compound reacts with the carbon of the negative electrode at the initial charging discharging period according to unique electrochemical characteristics thereof, so that the compound may be dissolved or an unstable film may be formed. Therefore, the ion mobility in the battery deteriorates, and the gas generated in the inner portion of the battery, causes the internal pressure to increase. As a result, there are problems of deterioration in storage property, stability, life cycle, and capacitance of the battery.

SUMMARY OF THE INVENTION

An aspect of the present invention provides an electrolyte for a lithium secondary battery capable of suppressing gas generation in an inner portion of the battery causing expansion in thickness.

According to another aspect of the present invention, there is provided an electrolyte for a lithium secondary battery capable of maintaining good battery performance and substantially preventing swelling caused from gas generation.

According to an aspect of the present invention, there is provided an electrolyte for a lithium secondary battery, including a lithium salt; a non-aqueous organic solvent including γ-butyrolactone; and a succinic anhydride.

According to another aspect of the present invention, there is provided a lithium secondary battery including the electrolyte according to the aforementioned aspect.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
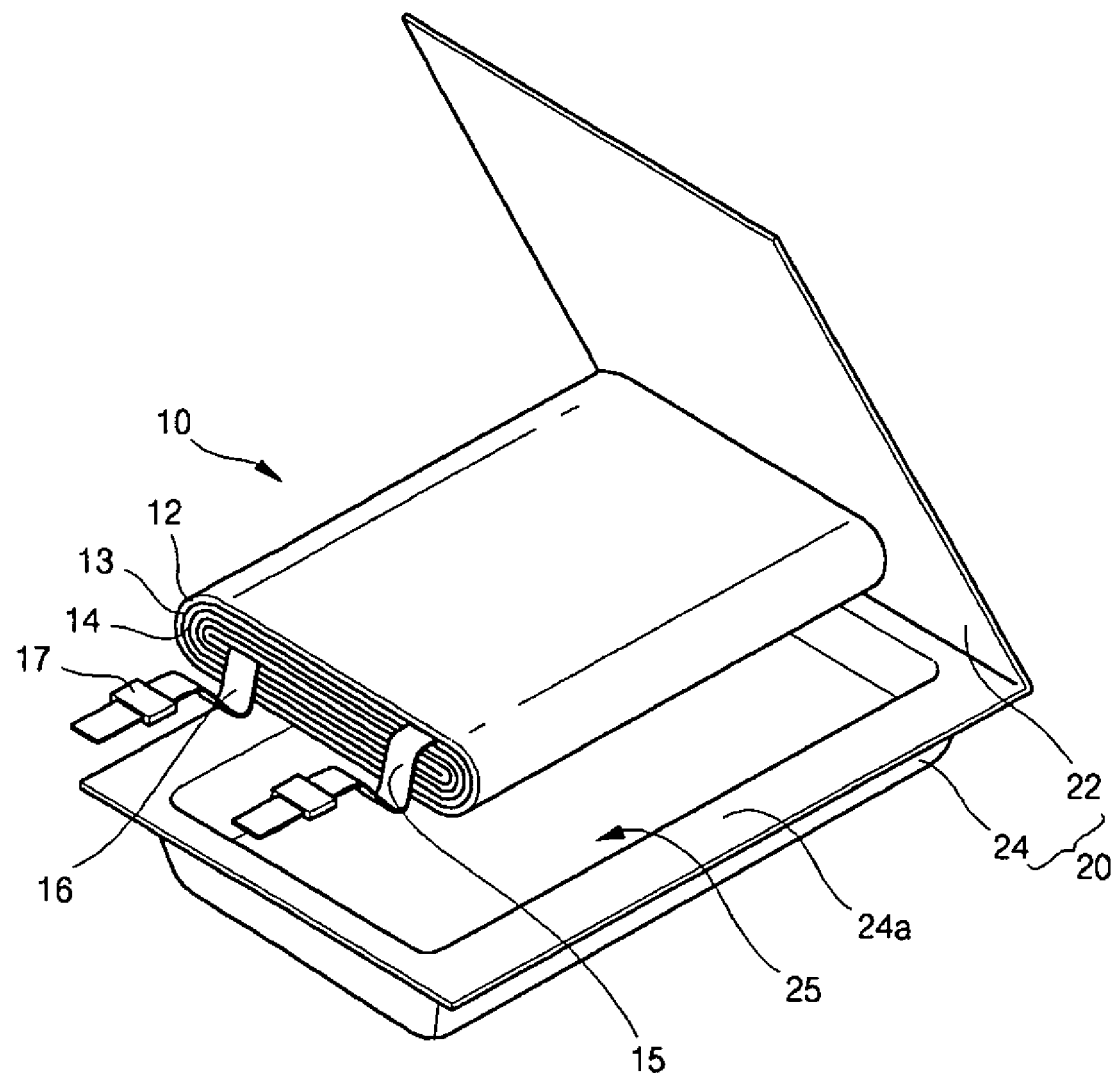
FIG. 1 is a perspective view showing a pouch-type secondary battery.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to solve a swelling problem of a γ-butyrolactone, there is proposed a technique for mixing a solvent with γ-butyrolactone (GBL) having a high boiling point and a high dielectric constant. The solvent used is ethylene carbonate. In this case, there are problems of high viscosity and wettability to a separator. Therefore, in many cases, the solvent is mixed with solvents having a low boiling point and a low dielectric constant. However, in these cases, a high temperature swelling problem cannot be solved.

According to an aspect of the present invention, since a succinic anhydride is added to the GBL-based electrolyte, thermal stability is improved, so that it is possible to effectively suppress gas generation in an inner portion of the battery. The succinic anhydride is a compound expressed by the following chemical structure and an organic acidic anhydride having a boiling point of 261° C.

In a lithium secondary battery including the electrolyte according to an aspect of the present invention, since the gas generation in the inner portion of the battery is suppressed, the swelling phenomenon, that is, an expansion in the thickness of the battery, can be greatly suppressed, and a good performance of battery such as charging characteristics can be maintained.

The succinic anhydride having a weight ratio ranging from 0.5 wt % to 2.0 wt % is added to the non-aqueous electrolyte. If the additive amount of the succinic anhydride is less than 0.5 wt %, the gas generation in the inner portion of the battery cannot be effectively suppressed. If the additive amount is more than 2.0 wt %, the charging characteristics deteriorate.

An additive volume ratio of the GBL in a range from 1 vol % to 90 vol % may be added, and more preferably, from 10 vol % to 60 vol %.

As a component of the electrolyte, the lithium salt functions as a source for supplying lithium ions in a battery enabling fundamental operation of a lithium battery, and the non-aqueous organic solvent functions as a medium for transferring the ions participating in an electrochemical reaction in a battery. The lithium salt may include at least one selected from a group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers) LiCl, and LiI, or a mixture of two or more thereof. A preferred material has low lattice energy and low dissociation so as to obtain a good ion conductivity, thermal stability, and oxidation resistance.

The concentration of the lithium salt may be in a range from 0.6 M to 2.0M, preferably, from 0.7 M to 1.6M. If the concentration of the lithium salt is below 0.6M, the conductivity of the electrolyte is reduced, and the performance of the electrolyte is degraded. If the concentration of the lithium salt is over 2.0M, the viscosity of the electrolyte increases, and mobility of the lithium salt is reduced.

The non-aqueous organic solvent may include at least one selected from a group consisting of carbonate, ester, ether, and ketone, or a mixture of two or more of them. The organic solvent should have a high dielectric constant and a low viscosity in order to increase ion dissociation and facilitate conductivity of the ions. Typically, a mixed solvent composed of two or more solvents, of which one has a high dielectric constant and a high viscosity and the other has a low dielectric constant and a low viscosity, is preferably used as the organic solvent.

When a carbonate based solvent is used as a non-aqueous organic solvent, a mixture of cyclic carbonate and chain carbonate is preferably used. In this case, a volume ratio of the cyclic carbonate to the chain carbonate is preferably in a range of 1:1 to 1:9, and more preferably, from 1:1.5 to 1:4. In this volume ratio, a good performance of the electrolyte can be maintained.

When a carbonate based solvent is used as a non-aqueous organic solvent, a mixture of cyclic carbonate and chain carbonate is preferably used. For example, ethylene carbonatev (EC), propylene carbonate (PC), 1,2-butylene carbonate, 2,3-butylene carbonate, 1,2-pentylene carbonate, 2,3-pentylene carbonate, vinylene carbonate (VC), or the like, may be used as the cyclic carbonate. Materials having a high dielectric constant, such as ethylene carbonate and propylene carbonate, are preferably used. When artificial graphite is used as the negative electrode activation material, ethylene carbonate is preferable. The chain carbonate may include dimethyl carbonate (DMC), diethyl carbonate (DEC), dipropyl carbonate (DPC), methylpropyl carbonate (MPC), ethylmethyl carbonate (EMC), ethylpropyl carbonate (EPC), or the like. Materials having a low viscosity, such as dimethyl carbonate, ethylmethyl carbonate, and diethyl carbonate are preferable.

The ester may include methyl acetate, ethyl acetate, propyl acetate, methyl propionate, ethyl propionate, γ-butyrolactone (GBL), γ-valerolactone, γ-caprolactone, δ-valerolactone, ε-caprolactone, and the like. The ether may include tetrahydrofuran, 2-methyltetrahydrofuran, dibuthylether, and the like. The ketone may include poly(vinyl methyl ketone), and the like.

In the electrolyte according to an aspect of the present invention, an aromatic hydrocarbon-based organic solvent may be further included in the carbonate-based solvent.

As the aromatic hydrocarbon-based organic solvent, an aromatic hydrocarbon-based compound expressed by the following Chemical Formula 1 may be used.

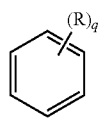

[Chemical Formula 1]

In Chemical Formula 1, R is a halogen radical or an alkyl radical having one to ten carbon atoms, q is an integer ranging from 0 to 6.

Examples of the aromatic hydrocarbon-based organic solvent include benzene, fluorobenzene, bromobenzene, chlorobenzene, toluene, and xylene, mesitylene. These materials may be used individually, or in the form of a mixture. In the electrolyte including the aromatic hydrocarbon-based organic solvent, a volume ratio of the carbonate solvent to the aromatic hydrocarbon-based organic solvent is preferably in a range from 1:1 to 30:1. In this volume ratio, a good performance of the electrolyte can be maintained.

In addition, according to an aspect of the present invention, a carbonate having a subsistent selected from a group consisting of a halogen, a cyano radical (CN), and a nitro radical ($NO_2$), vinylene carbonate, divinyl sulfone, and ethylene sulfite may be further included as an additive. Due to the additive, it is possible to obtain a battery having good electrochemical characteristics such as a high temperature swelling characteristic, capacitance, life cycle and, a low temperature characteristic.

A preferred carbonate additive is an ethylene carbonate derivative expressed by the following Chemical Formula 2, and a most preferred carbonate additive is a fluoroethylene carbonate.

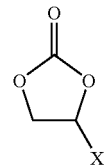

[Chemical Formula 2]

In Chemical Formula 2, X is selected from a group consisting of a halogen, a cyano radical (CN), and a nitro radical ($NO_2$).

A weight ratio of the carbonate additive to the electrolyte is in a range from 0.01 wt % to 10 wt %, and preferably, from 0.01 wt % to 5 wt %. If the weight ratio of the carbonate additive is less than 0.01 wt %, the gas generation in the inner portion of the battery cannot be effectively suppressed. If the weight ratio of the carbonate additive is more than 10 wt %, the life cycle of the battery at a high temperature is shortened, and also at a high temperature a swelling problem results.

The electrolyte according to an aspect of the present invention can be used not only for a roll-type battery and a polygon type battery but also for a lithium ion polymer battery using a liquid electrolyte.

In a case where the electrolyte according to an aspect of the present invention is used as a polymer electrolyte, a polymer forming compound and a polymerization initiator may be further included. The polymer electrolyte may be a gel-state polymer electrolyte formed by producing a battery using an electrolyte precursor solution which is formed by adding the polymer forming compound and the initiator to the electrolyte and maintaining the battery in a predetermined temperature where a polymerization process is performed for a predetermine time. Alternatively, the polymerization process may be performed outside the battery before the battery assembling process.

The polymer forming compound is a compound having at least one carbon-carbon double bonding at a distal end thereof. Examples of the polymer forming compound include a multi-functional acrylate (a polymer of polyester (metha) acrylate formed by transforming at least a portion of hydroxyl radicals of a polyester polyol into (metha)acrylic ester), poly (ethylene glycol) dimethacrylate, poly(ethylene glycol)diacrylate, poly(ethylene glycol) divinyl ether, ethylene glycol dimetacrylate, ethylene glycol diacrylate, ethylene glycol divinyl ether hexanediol diacrylate, tripropylene glycol diacrylate, tetraethylene glycol mono acrylate, caprolactone acrylate, and a mixture thereof.

As an example of the multi-functional acrylate, there are compounds expressed by Chemical Formulas 3 and 4.

[Chemical Formula 3]

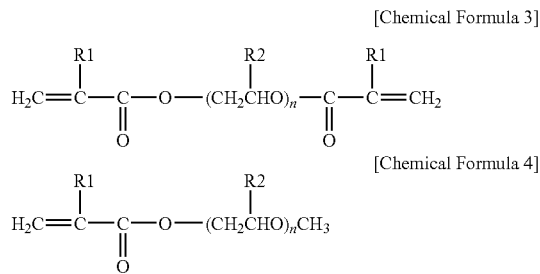

[Chemical Formula 4]

In Chemical Formulas 3 and 4, $R_1$ is an alkyl radical of H or $C_1$ to $C_6$, n is an integer ranging from 1 to 100,000, and $R_2$ is an alkyl radical of H or $C_1$ to $C_6$.

Any production method may be used to synthesize the (polyester) polyol having more than three hydroxyl radicals. Alternatively, a commercially available (polyester) polyol may be used. Examples of the (polyester) polyol having more than three hydroxyl radicals include a trialkylol such as trimethylol and tripropylol, a glycerol, and an erythritol such as pentaerythritol and dipentaerythritol.

A typical esterification reaction may be used to transform a portion or all of the hydroxyl radicals of the (polyester) polyol into a (metha)acrylic ester. Examples of polyesterification reactions include a method of performing a condensation of the (polyester) polyol, the (metha)acrylic, or derivatives thereof (for example, a halogenated (metha)acrylic) in a base catalyst and a method of performing a condensation of the (polyester) polyol, the (meta) acrylic, or derivatives thereof (for example, a halogenated (metha)acrylic) in an acid catalyst. In addition, any known method may be used to synthesize the poly(metha)acrylic ester from the (polyester) polyol, the (metha)acrylic, or derivatives thereof. The poly(ester) (metha)acrylate used in an aspect of the present invention may be produced according to a method disclosed in Korean Patent Application Publication No. 2003-79310.

The polymerization initiator can initiate polymerization of the polymer forming compound. Any material which does not deteriorate a performance of battery can be used as the polymerization initiator. The polymerization initiator may be an organic peroxide, an azo-based compound, or a mixture thereof.

Examples of the organic peroxide include: a diacyl peroxide such as diacetyl peroxide, dibenzoyl peroxide, dilauroyl peroxide, and bis-3,5,5-trimethylhexanoyl peroxide, a peroxy dicarbonate such as di(4-t-buthylcyclohexyl) peroxy dicarbonate, di-2-ethylhexyl peroxy dicarbonate, di-isopropyl peroxy dicarbonate, di-3-metoxybuthyl peroxy dicarbonate, t-buthyl peroxy-isopropyl carbonate, t-buthyl peroxy-2-ethylhexylcarbonate, 1,6-bis(t-buthyl peroxy carbonyloxy) hexane, and diethylene glycol-bis(t-buthyl peroxy carbonate), and a peroxy ester such as t-buthyl peroxy pivalate, t-amyl peroxy pivalate, t-buthyl peroxy-2-ethyl-hexanoate, t-hexyl peroxy pivalate, t-buthyl peroxy neoheptanoate, t-hexyl peroxy pivalate, 1,1,3,3-tetramethylbuthyl peroxy neodecarbonate, 1,1,3,3-tetramethylbuthyl2-ethyl hexanoate, t-amyl peroxy 2-ethyl hexanoate, t-buthyl peroxy isobutyrate, t-amyl peroxy-3,5,5-trimethylhexanoate, t-buthyl peroxy 3,5,5-trimethylhexanoate, t-buthyl peroxy acetate, t-buthyl peroxy benzoate, and di-butyl peroxy trimethyl.

Examples of the azo-based compound include 2,2'-azo-bis (isobutyronitrile), 2,2'-azo-bis(2,4-dimethyl valeronitrile), and 1,1'-azo-bis(cyanocyclo-hexane).

A weight ratio of the polymer forming compound to the electrolyte is in a range from 1:1 to 1:1000, and preferably, from 1:5 to 1:200. If the amount of the electrolyte is less than the lower limit value, too much gelation proceeds, so that ion conductivity is reduced. If the amount of the electrolyte is more than the upper limit value, since too small gelation proceeds, a liquid electrolyte can freely move, so corrosion of lithium due to the liquid electrolyte can not be prevented. In addition, a weight ratio of the polymer forming compound to the initiator is preferably in a range from 1:0.0001 to 1:0.5, and more preferably, from 1:0.001 to 1:0.2. If the amount of the initiator is less than the lower limit value, the gelation does not easily proceed. If the amount of the initiator is more than the upper limit value, too much gas is generated, and the initiator which does not participate in the reaction may affect the performance of the battery.

A lithium secondary battery including the electrolyte according to an aspect of the present invention has positive and negative electrodes.

The positive electrode includes a positive electrode activation material which can intercalate and deintercalate lithium ions. As a preferred example of the positive electrode activation material, there is a least one of complex oxides of lithium and a least one selected from cobalt, manganese, and nickel. As a representative example, there are lithium-contained compounds as follows.

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yM'_zA_4 \quad (4)$$

$$Li_xCo_{1-y}M_yA_2 \quad (5)$$

$$Li_xCo_{1-y}M_yO_{2-z}X_z \quad (6)$$

$$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_a \quad (10)$$

$$Li_xNi_{1-y-z}Co_yM_zO_{2-a}X_a \quad (11)$$

$$Li_xNi_{1-y-z}Mn_yM_zA_a \quad (12)$$

$$Li_xNi_{1-y-z}Mn_yM_zO_{2-a}X_a \quad (13)$$

In the above chemical formulas, $0.9 \leq x \leq 1.1$, $0 \leq y \leq 0.5$, $0 \leq z \leq 0.5$, $0 \leq a \leq 2$, M and M' are equal to or different from each other, M and M' are an element selected from a group consisting of Mg, Al, Co, K, Na, Ca, Si, Ti, Sn, V, Ge, Ga, B, As, Zr, Mn, Cr, Fe, Sr, V, and rare earth elements, A is selected from a group consisting of O, F, S, and P, and X is selected from a group of F, S, and P.

The negative electrode includes a negative electrode activation material which can intercalate and deintercalate lithium ions. Examples of the negative electrode activation material include a carbon material such as a crystalline carbon, an amorphous carbon, a carbon complex, and a carbon fiber, a lithium metal, and a lithium alloy. For example, the amorphous carbon may include hard carbon, cokes, mesocarbon micro-bead (MCMB) plasticized in a temperature of 1500° C. or less, meso-phase pitch-based carbon fiber (MPCF), or the like. The crystalline carbon may include a graphite-based material, more specifically, such as natural graphite, graphite-based cokes, graphite-based MCMB, graphite-based MPCF, or the like. More preferably, with respect to the carbon material, an inter-planar distance d002 thereof is in a range of from 3.35 Å to 3.38 Å, and a crystallite size Lc thereof in an X-ray diffraction is 20 nm or more. The lithium alloy may include an alloy with aluminum (Al), zinc (Zn), bismuth (Bi), cadmium (Cd), antimony (Sb), silicon (Si), lead (Pb), tin, gallium (Ga), or indium (In).

In production of the positive and negative electrodes, a slurry composite is produced by dispersing an activation material, a binder, a conductive material, and a thickener, if needed, in a solvent, and the slurry composite is coated on an electrode charge collector. The positive electrode charge collector may be made of aluminum, an aluminum alloy, or the like, and the negative electrode charge collector may be made of copper, a copper alloy, or the like. The positive and negative electrode charge collectors may be in a shape of a foil, a film, or a sheet, a punched structure, a porous structure, or a foamed structure.

The binder for activation materials has functions of softening activation materials like pastes, consolidating inter-bonding of activation materials and bonding forces with a charge collector, buffering the swelling or shrinkage of the activation materials, and the like. For example, the binder may include polyvinylidene fluoride, co polymer of poly-hexafluoropropylene and polyvinyledene fluoride (P (VdF/HFP), poly(vinylacetate), polyvinyl alcohol, polyethylene oxide, polyvinyl pyrrolidone, alkylated polyethylene oxide, polyvinyl ether, poly(methyl metacrylate), poly(ethyl acrylate), polytetrafluoro ethylene, polyvinyl chloride, polyacrylonitrile, polyvinyl pyridine, styrene-butadiene rubber, acrylonitrile-butadiene rubber, and the like. The composition of the binder may range from 1 to 10 wt % for the electrode activation material. If the composition of the binder is less than 1 wt %, the composition of the binder is too small, and the binding force between the activation material and the charge collector is not sufficient. If the composition of the binder is more than 10 wt %, the composition of the binder is too large, and although the binding force is sufficient, the composition of the electrode activation material is reduced. This is disadvantageous to increase the battery capacity.

The conductive material used for improving electric conductivity may be selected from a group consisting of a carbon-based conductive material, a carbon-black-based conductive material, a metal-based conductive material, and a metal-compound-based conductive material. The graphite based conductor may include artificial graphite, natural graphite, and the like. The carbon black based conductor may include acetylene black, ketjen black, denka black, thermal black, channel black, and the like. The metal or metal compound based conductor may include tin, tin (IV) oxide, tin phosphoric acid, titanium oxide, potassium titanate, perovskite such as $LaSrCoO_3$, and $LaSrMnO_3$, and the like. However, aspects of the present invention are not limited to the aforementioned conductors. The additive amount, that is, the composition of the conductive material may range from 0.1 to 10 wt % for the electrode activation material. If the composition of the conductive material is less than 0.1 wt %, the electrochemical property may be degraded. If the composition of the conductive material is larger than 10 wt %, the energy density per unit weight is reduced.

Any material capable of adjusting a viscosity of an activation material slurry may be used as the thickener without particular limitation. Examples of the thickener include carboxy methyl cellulose, hydroxy methyl cellulose, hydroxy ethyl cellulose, and hydroxy propyl cellulose.

The solvent used for dispersing the electrode activation material, the binders, the conductive material, and the like may be aqueous or non-aqueous. For example, N-methyl-2-pyrrolidone (NMP), dimethyl formamide, dimethyl acetamide, N,N-dimethylamino prophylamine, ethylene oxide, tetrahydrofuran, or the like, may be used as the non-aqueous solvent.

The lithium secondary battery may include a separator for preventing a short-circuit between the positive and negative electrodes and providing a transport channel from the lithium ions. A polyolefin based polymer film such as polypropylene, polyethylene, polyethylene/polypropylene, polyethylene/polypropylene/polyethylene, and polypropylene/polyethylene/polypropylene, a multi-layered film thereof, a microporous film thereof, a woven textile fabric thereof, non-woven textile fabric thereof, or other well-known ones may be used as the separator. A film formed by coating a resin having an excellent stability on the micro-porous polyolefin film may additionally be used as the separator.

FIG. 1 is a perspective view showing a typical pouch-type secondary battery.

The pouch-type secondary battery includes an electrode assembly 10 and a pouch case 20 receiving and sealing the electrode assembly 10. The electrode assembly 10 is formed by stacking a positive electrode 12, a separator 13, and a negative electrode 14 in a stacked shape or by rolling the stacked structure in a jelly-roll shape. Positive and negative electrode taps extend from one side of each of the electrode plates of the electrode assembly 10, and surfaces thereof are attached with a protective tape 17, so that the taps are arranged to partially protrude from the pouch case 20.

The pouch case 20 includes a case cover 22 and a case body 24 having a space 25 for receiving the electrode assembly 10. At least one side of the case cover 22 and the case body 24 are integrally attached with each other. The case body 24 includes a space for housing the electrode assembly 10, and a sealing member 24a is provided along the sides of the space 25 excluding one side which integrally contacts the case cover 22. After the electrode assembly 10 is placed in the space 25 of the case body 22, the case body 24 and the case cover 24 are closely pressed, the sealing member 24a is thermally fused, and the case body 20 is sealed.

The electrolyte according to an aspect of the present invention is injected into the battery case and the sealing is performed. After that, the resulting product is heated at a temperature ranging from 40° C. to 100° C. for 30 minutes or 8 hours, so that the polymerization reaction in the inner portion of the battery is performed. As a result, the lithium secondary battery is produced.

COMPARATIVE EXAMPLE 1

Ethylene carbonate (EC), ethylmethyl carbonate (EMC), and γ-butyrolactone (GBL) are mixed with a volume ratio of 30:10:60 to form a non-aqueous organic solvent. Next, 1.15M $LiPF_6$ and 0.2M $LiBF_4$ are dissolved in the non-aqueous organic solvent. Next, fluoroethylene carbonate (FEC) with a weight ratio of 15 wt % is added. In addition, polyethylene glycol diacrylate as a polymer compound with a weight ratio of 0.50 wt % and lauroyl peroxide as a polymerization initiator with a weight ratio of 1 wt % (based on the weight of the polymer forming compound) are added. As a result, an electrolyte is produced.

A slurry is produced by adding a positive electrode activation material $LiCoO_2$ (average particle diameter: 10 μm), conductive material (super P), and a binder (PVDF) with a weight ratio of 94:3:3 to N-methylpyrrolidone (NMP). A positive electrode plate is constructed by coating the slurry on an aluminum foil having a thickness of 20 μm, drying thereof, and rolling the coated foil with a roll press machine. A negative electrode plate is constructed as follows. A slurry is produced by dispersing an artificial graphite (Smilion) as a negative electrode activation material, styrene-butadiene rubber (SBR) as a binder, and carboxy methyl cellulose (CMC) as a thickener in water. The negative electrode plate is constructed by coating the slurry on an aluminum foil having a thickness of 15 μm, drying thereof, and rolling the coated foil with a roll press machine. Next, a separator which is constructed with a polyethylene (PE) porous film (thickness: 25 μm) is interposed between the positive and negative electrode plates, and winding and pressing are performed. Next, the resulting product is inserted into the pouch case, and after that, the electrolyte is injected. After a sealing process, the resulting product is subject to heating in a thermal wind oven in a temperature of 65° C. for 4 hours. As a result, a pouch-type lithium secondary battery is produced.

COMPARATIVE EXAMPLE 2 to 4

Comparative Examples 2 to 4 are the same as Comparative Example 1, but different electrolytes having compositions of $LiBF_4$ and FEC shown in Table 1 are used.

First Embodiment

First embodiment is the same as Comparative Example 1, but the electrolyte formed by adding succinic anhydride with a weight ratio of 0.5 wt % is used.

Second to Eighth Embodiments and Comparative Examples 9 to 16

Second to eighth Embodiments and Comparative Examples 9 to 16 are the same as Comparative Example 1, but different electrolytes having compositions of $LiBF_4$ and FEC shown in Table 1 are used.

TABLE 1

| | Organic Solvent (Volume Ratio) | | | Electrolyte Salt | | Poly Ethylene Glycol Dimetacrylate | Dilauroyl Peroxide | FEC | Succinic Anhydride |
|---|---|---|---|---|---|---|---|---|---|
| | EC | EMC | GBL | $LiPF_6$ | $LiBF_4$ | (Wt %) | (Wt %) | (Wt %) | (Wt %) |
| Comparative Example 1 | 30 | 10 | 60 | 1.15 M | 0.2 M | 0.50 | 1 | 5.0 | |
| Comparative Example 2 | 30 | 10 | 60 | 1.15 M | | 0.50 | 1 | 5.0 | |
| Comparative Example 3 | 30 | 10 | 60 | 1.15 M | 0.2 M | 0.50 | 1 | | |
| Comparative Example 4 | 30 | 10 | 60 | 1.15 M | | 0.50 | 1 | | |
| Embodiment 1 | 30 | 10 | 60 | 1.15 M | 0.2 M | 0.50 | 1 | 5.0 | 0.5 |
| Embodiment 2 | 30 | 10 | 60 | 1.15 M | | 0.50 | 1 | 5.0 | 0.5 |
| Embodiment 3 | 30 | 10 | 60 | 1.15 M | 0.2 M | 0.50 | 1 | | 0.5 |
| Embodiment 4 | 30 | 10 | 60 | 1.15 M | | 0.50 | 1 | | 0.5 |
| Embodiment 5 | 30 | 10 | 60 | 1.15 M | 0.2 M | 0.50 | 1 | 5.0 | 1 |
| Embodiment 6 | 30 | 10 | 60 | 1.15 M | | 0.50 | 1 | 5.0 | 1 |
| Embodiment 7 | 30 | 10 | 60 | 1.15 M | 0.2 M | 0.50 | 1 | | 1 |
| Embodiment 8 | 30 | 10 | 60 | 1.15 M | | 0.50 | 1 | | 1 |
| Comparative Example 9 | 30 | 10 | 60 | 1.15 M | 0.2 M | 0.50 | 1 | 5.0 | 3 |
| Comparative Example 10 | 30 | 10 | 60 | 1.15 M | | 0.50 | 1 | 5.0 | 3 |
| Comparative Example 11 | 30 | 10 | 60 | 1.15 M | 0.2 M | 0.50 | 1 | | 3 |
| Comparative Example 12 | 30 | 10 | 60 | 1.15 M | | 0.50 | 1 | | 3 |
| Comparative Example 13 | 30 | 10 | 60 | 1.15 M | 0.2 M | 0.50 | 1 | 5.0 | 5 |
| Comparative Example 14 | 30 | 10 | 60 | 1.15 M | | 0.50 | 1 | 5.0 | 5 |
| Comparative Example 15 | 30 | 10 | 60 | 1.15 M | 0.2 M | 0.50 | 1 | | 5 |
| Comparative Example 16 | 30 | 10 | 60 | 1.15 M | | 0.50 | 1 | | 5 |

In Table 1, EC=ethylene carbonate, EMC=ethylmethyl carbonate, GBL=γ-butyrolactone, and FEC=monofluoro ethylene carbonate.

[Swelling Characteristic]

With respect to the lithium secondary batteries according to Comparative Examples 1 to 4 and 9 to 16 and the first to eighth embodiments, the batteries are charged with 1C/4.2V constant current and voltage and cut-off at 20 mAh, and after that, the batteries are maintained in a room temperature for one day. Thereafter, the thicknesses of the batteries are measured, and the results are shown in Table 2.

[Discharging Characteristic]

With respect to the lithium secondary batteries according to Comparative Examples 1 to 4 and 9 to 16 and the first to eighth embodiments, the batteries are charged with 1C/4.2V constant current and voltage and cut-off at 20 mAh, and after that, the batteries are discharged with cut-off at 0.2C and 3C/3V. Thereafter, rating capacitances and 3C-discharging capacitances are measured, and the results are shown in Table 2. In addition, formation efficiencies of the batteries are measured, and the results are shown in Table 2

TABLE 2

(delete Comparative Example 5 to 8)

| | Thickness In Initial Charging State, In Room Temp. For One Day (mm) | Rating Capacitance (mAh/g) | 3C-Discharging Capacitance (Ah/g) | Formation Efficiency (%) |
|---|---|---|---|---|
| Comparative Example 1 | 3.86 | 832 | 511 | 92.2 |
| Comparative Example 2 | 3.84 | 834 | 507 | 92.2 |
| Comparative Example 3 | 4.69 | 534 | 266 | 74.6 |
| Comparative Example 4 | 5.05 | 538 | 152 | 67.9 |
| Embodiment 1 | 3.85 | 833 | 463 | 92.4 |
| Embodiment 2 | 3.85 | 836 | 451 | 92.4 |
| Embodiment 3 | 4.10 | 677 | 316 | 80.3 |
| Embodiment 4 | 4.00 | 692 | 310 | 82.6 |
| Embodiment 5 | 3.89 | 667 | 450 | 91.7 |
| Embodiment 6 | 3.87 | 734 | 471 | 92.1 |
| Embodiment 7 | 3.88 | 712 | 417 | 85.3 |
| Embodiment 8 | 3.91 | 705 | 368 | 84.5 |
| Comparative Example 9 | 3.85 | 580 | 72 | 78.9 |
| Comparative Example 10 | 3.87 | 577 | 50 | 79.2 |
| Comparative Example 11 | 3.82 | 515 | 33 | 74.7 |
| Comparative Example 12 | 3.87 | 512 | 30 | 75.0 |
| Comparative Example 13 | 3.86 | 832 | 511 | 92.2 |
| Comparative Example 14 | 3.84 | 834 | 507 | 92.2 |
| Comparative Example 15 | 4.69 | 534 | 266 | 74.6 |
| Comparative Example 16 | 5.05 | 538 | 152 | 67.9 |

In the batteries according to the first to eighth embodiments and Comparative Examples 9 to 16 where the succinic anhydride is added, it can be seen that the gas generation in the inner portion of the batteries is suppressed irrespective of the electrolyte additive, so that the swelling can be suppressed.

In addition, in the batteries according to the first to eighth embodiments, it can be seen that a good discharging capacitance is obtained.

In the batteries according to Comparative Examples 1 to 4 where the succinic anhydride is not added, it can be seen that the discharging capacitance varies greatly according to the presence or absence of the electrolyte additive. In addition, in the batteries according to Comparative Examples 9 to 16, it can be seen that the swelling can be greatly suppressed but the discharging capacitance is reduced.

According to an aspect of the present invention, it is possible to obtain an electrolyte for a lithium secondary battery capable of suppressing gas generation in an inner portion of the battery causing expansion in the thickness of the battery and to obtain an electrolyte for a lithium secondary battery capable of maintaining good battery performance and substantially preventing swelling caused from gas generation.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium secondary battery comprising:
   a lithium salt;
   a non-aqueous organic solvent comprising γ-butyrolactone and a carbonate solvent;
   an aromatic hydrocarbon-based organic solvent; and
   succinic anhydride,
   wherein:
      the non-aqueous organic solvent further comprises at least one solvent selected from the group consisting of an ester, an ether, and a ketone, and
      the carbonate solvent is a mixture of a chain carbonate and cyclic carbonate.

2. The electrolyte according to claim 1, wherein the concentration of the succinic anhydride in the electrolyte ranges from 0.5 wt % to 2 wt %.

3. The electrolyte according to claim 2, wherein the concentration of the γ-butyrolactone in the non-aqueous organic solvent ranges from 1 vol % to 90 vol %.

4. The electrolyte according to claim 3, wherein the concentration of the γ-butyrolactone in the non-aqueous organic solvent ranges from 1 vol % to 60 vol %.

5. The electrolyte according to claim 1, wherein the cyclic carbonate comprises at least one solvent selected from the group consisting of ethylene carbonate, propylene carbonate, 1,2-butylene carbonate, 2,3-butylene carbonate, 1,2-pentylene carbonate, and 2,3-pentylene carbonate.

6. The electrolyte according to claim 1, wherein the chain carbonate comprises at least one solvent selected from the group consisting of dimethyl carbonate, diethyl carbonate, dipropyl carbonate, methylpropyl carbonate, ethylmethyl carbonate, and ethylpropyl carbonate.

7. The electrolyte according to claim 1, wherein the lithium salt is one, two, or more selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, and $LiN(C_xF_{2x+1}SO_2)(C_yF_{2y+1}SO_2)$ (x and y are a natural number), LiCl, and LiI.

8. The electrolyte according to claim 7, wherein the concentration of the lithium salt ranges from 0.6 M to 2.0 M.

9. The electrolyte according to claim 1, wherein the concentration of the lithium salt ranges from 0.7 M to 1.6 M.

10. The electrolyte according to claim 1, wherein the volume ratio of the cyclic carbonate to the chain carbonate is in the range of 1:1 to 1:9.

11. An electrolyte for a lithium secondary battery comprising:
a lithium salt;
a non-aqueous organic solvent comprising γ-butyrolactone, an aromatic hydrocarbon-based organic solvent and a carbonate solvent; and
succinic anhydride,
wherein the carbonate solvent is a mixture of a chain carbonate and a cyclic carbonate.

12. The electrolyte according to claim 11, wherein:
the aromatic hydrocarbon-based organic solvent is an aromatic compound expressed by the following Chemical Formula 1,

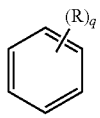

[Chemical Formula 1]

R is a halogen radical or an alkyl radical having one to ten carbon atoms, and
q is an integer from 0 to 6.

13. The electrolyte according to claim 12, wherein the aromatic hydrocarbon-based organic solvent is at least one solvent selected from the group consisting of benzene, fluorobenzene, chlorobenzene, bromobenzene, toluene, xylene, mesitylene, and a mixture thereof.

14. The electrolyte according to claim 11, wherein the carbonate solvent and the aromatic hydrocarbon-based organic solvent are mixed with a volume ratio ranging from 1:1 to 30:1.

15. An electrolyte for a lithium secondary battery comprising:
a lithium salt;
a non-aqueous organic solvent comprising γ-butyrolactone and a carbonate solvent; and
succinic anhydride,
wherein:
the carbonate solvent is a mixture of a chain carbonate and a cyclic carbonate, and
the electrolyte further comprises a carbonate additive having a substituent selected from the group consisting of a halogen, a cyano radical (CN), a nitro radical ($NO_2$), vinylene carbonate, divinyl sulfone, and ethylene sulfite.

16. The electrolyte according to claim 15, wherein
the carbonate additive is a carbonate expressed by the following Chemical Formula 2, and

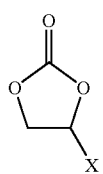

[Chemical Formula 2]

X is selected from the group consisting of a halogen, a cyano radical (CN), and a nitro radical ($NO_2$).

17. The electrolyte according to claim 15, wherein the carbonate additive is fluoroethylene carbonate.

18. The electrolyte according to claim 15, wherein the concentration of the carbonate additive in the electrolyte is in the range from 0.01 wt % to 10 wt %.

19. An electrolyte for a lithium secondary battery comprising:
a lithium salt;
a non-aqueous organic solvent comprising γ-butyrolactone and a carbonate solvent;
succinic anhydride; and
a polymer forming compound,
wherein the carbonate solvent is a mixture of a chain carbonate and a cyclic carbonate.

20. The electrolyte according to claim 19, wherein the polymer forming compound is at least one compound selected from the group consisting of a multi-functional acrylate (a polymer of polyester (metha)acrylate formed by transforming at least a portion of hydroxyl radicals of a polyester polyol into (metha)acrylic ester), poly(ethylene glycol) dimethacrylate, poly(ethylene glycol) diacrylate, poly(ethylene glycol) divinyl ether, ethylene glycol dimethacrylate, ethylene glycol diacrylate, ethylene glycol divinyl ether hexanediol diacrylate, tripropylene glycol diacrylate, tetraethylene glycol mono acrylate, caprolactone acrylate, and a mixture thereof.

21. The electrolyte according to claim 19, wherein the weight ratio of the polymer forming compound to the electrolyte ranges from 1:1 to 1:1000.

22. The electrolyte according to claim 19, further comprising a polymerization initiator.

23. The electrolyte according to claim 22, wherein the polymerization initiator is an organic peroxide, an azo-based compound, or a mixture thereof.

24. The electrolyte according to claim 23, wherein the organic peroxide is:
a diacyl peroxide selected from the group consisting of diacetyl peroxide, dibenzoyl peroxide, dilauroyl peroxide, and bis-3,5,5-trimethylhexanoyl peroxide,
a peroxy dicarbonate selected from the group consisting of di(4-t-butylcyclohexyl) peroxy dicarbonate, di-2-ethylhexyl peroxy dicarbonate, di-isopropyl peroxy dicarbonate, di-3-methoxybutyl peroxy dicarbonate, t-butyl peroxy-isopropyl carbonate, t-butyl peroxy-2- ethylhexylcarbonate, 1,6-bis(t-butyl peroxy carbonyloxy) hexane, and diethylene glycol-bis(t-butyl peroxy carbonate), and
a peroxy ester selected from the group consisting of t-butyl peroxy pivalate, t-amyl peroxy pivalate, t-butyl peroxy-2-ethyl-hexanoate, t-hexyl peroxy pivalate, t-butyl peroxy neoheptanoate, 1,1,3,3-tetramethylbutyl peroxy neodecarbonate, 1,1,3,3-tetramethylbutyl-2-ethylhexanoate, t-amyl peroxy 2-ethyl hexanoate, t-butyl peroxy isobutyrate, t-amyl peroxy 3,5,5-trimethyl hexanoyl, t-butyl peroxy 3,5,5-trimethylhexanoate, t-butyl peroxy acetate, t-butyl peroxy benzoate, and di-buthyl peroxy trimethyl adipate.

25. The electrolyte according to claim 23, wherein the azo-based compound is selected from the group consisting of 2,2'-azo-bis(isobutylnitrile), 2,2'-azo-bis(2,4-dimethyl valeronitrile), and 1,1'-azo-bis(cyanocyclohexane).

26. The electrolyte according to claim 22, wherein the weight ratio of the polymer forming compound to the polymerization initiator is in the range from 1:0.0001 to 1:0.5.

27. A lithium secondary battery comprising:
a positive electrode comprising a positive electrode activation material which can intercalate and deintercalate lithium ions;

a negative electrode comprising a negative electrode activation material which can intercalate and deintercalate the lithium ions; and an electrolyte comprising:
a lithium salt;
a non-aqueous organic solvent comprising γ-butyrolactone, an aromatic hydrocarbon-based organic solvent and a carbonate solvent; and
succinic anhydride,
wherein the carbonate solvent is a mixture of a chain carbonate and a cyclic carbonate.

28. The lithium secondary battery according to claim 27, wherein:

the positive electrode activation material is selected from the group consisting of the following materials (1) to (13), $$Li_xMn_{1-y}M_{A2} \tag{1}$$

$$Li_xMn_{1-y}M_yA_2 \tag{2}$$

$$Li_xMn_2O_{4-z}X_z \tag{3}$$

$$Li_xMn_{2-y}M_yM'_zA_4 \tag{4}$$

$$Li_xCo_{1-y}M_yA_2 \tag{5}$$

$$Li_xCo_{1-y}M_yO_{2-z}X_z \tag{6}$$

$$Li_xNi_{1-y}M_yA_2 \tag{7}$$

$$Li_xNi_{1-y}M_yO_{2-z}X_z \tag{8}$$

$$Li_xNi_{1-y}Co_yO_{2-z}X_z \tag{9}$$

$$Li_xNi_{1-y-z}Co_yM_zA_a \tag{10}$$

$$Li_xNi_{1-y-z}Co_yM_zO_{2-a}X_a \tag{11}$$

$$Li_xNi_{1-y-z}Mn_yM_zA_a \tag{12}$$

$$Li_xNi_{1-y-z}Mn_yM_zO_{2-a}X_a \tag{13}$$

$0.9 \leq x \leq 1.1$, $0 \leq y \leq 0.5$, $0 \leq z \leq 0.5$, and $0 \leq a \leq 2$, M and M' are equal to or different from each other, M and M' are an element selected from the group consisting of Mg, Al, Co, K, Na, Ca, Si, Ti, Sn, V, Ge, Ga, B, As, Zr, Mn, Cr, Fe, Sr, V, and rare earth elements, A is selected from the group consisting of O, F, S, and P, and X is selected from the group consisting of F, S, and P.

29. The lithium secondary battery according to claim 27, wherein the negative electrode activation material is selected from the group consisting of crystalline carbon, amorphous carbon, a carbon complex, carbon fiber, lithium metal, and a lithium alloy.

* * * * *

UNITED STATES PATENT AND TRADEMARK OFFICE
CERTIFICATE OF CORRECTION

PATENT NO.        : 7,691,537 B2                                Page 1 of 1
APPLICATION NO.   : 11/481911
DATED             : April 6, 2010
INVENTOR(S)       : Cheonsoo Kim It is certified that error appears in the above-identified patent and that said Letters Patent is hereby corrected as shown below:

Column 17, line 19, change "$Li_xMn_{1-y}M_{A2}$" to --$Li_xMn_{1-y}M_yA_2$--;
Column 17, line 21, change "$Li_xMn_{1-y}M_yA_2$" to --$Li_xMn_{1-y}O_{2-z}X_z$--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO.        : 7,691,537 B2
APPLICATION NO.   : 11/481911
DATED             : April 6, 2010
INVENTOR(S)       : Cheonsoo Kim It is certified that error appears in the above-identified patent and that said Letters Patent is hereby corrected as shown below:

Column 17, line 19, change "$Li_xMn_{1-y}M_{A2}$" to --$Li_xMn_{1-y}M_yA_2$--;
Column 17, line 21, change "$Li_xMn_{1-y}M_yA_2$" to --$Li_xMn_{1-y}M_yO_{2-z}X_z$--.

This certificate supersedes the Certificate of Correction issued July 20, 2010.

Signed and Sealed this

Fourteenth Day of September, 2010

David J. Kappos
*Director of the United States Patent and Trademark Office*